US009076446B2

(12) United States Patent
Lin

(10) Patent No.: US 9,076,446 B2
(45) Date of Patent: Jul. 7, 2015

(54) METHOD AND APPARATUS FOR ROBUST SPEAKER AND SPEECH RECOGNITION

(71) Applicant: Qiguang Lin, Palo Alto, CA (US)

(72) Inventor: Qiguang Lin, Palo Alto, CA (US)

(*) Notice: Subject to any disclaimer, the term of this patent is extended or adjusted under 35 U.S.C. 154(b) by 274 days.

(21) Appl. No.: 13/843,935

(22) Filed: Mar. 15, 2013

(65) Prior Publication Data

US 2013/0253920 A1    Sep. 26, 2013

Related U.S. Application Data

(60) Provisional application No. 61/614,446, filed on Mar. 22, 2012.

(51) Int. Cl.
*G10L 19/02* (2013.01)
*G10L 21/00* (2013.01)
*G10L 25/93* (2013.01)
*G10L 21/02* (2013.01)
*G10L 15/00* (2013.01)
*G10L 17/00* (2013.01)
*G10L 17/20* (2013.01)
*G10L 15/02* (2006.01)
*G10L 15/20* (2006.01)
*G10L 17/02* (2013.01)

(52) U.S. Cl.
CPC .............. *G10L 17/20* (2013.01); *G10L 15/02* (2013.01); *G10L 15/20* (2013.01); *G10L 17/02* (2013.01)

(58) Field of Classification Search
USPC ................................ 704/204, 203
See application file for complete search history.

(56) References Cited

U.S. PATENT DOCUMENTS

| 5,666,466 | A  | * | 9/1997  | Lin et al. ............... 704/246 |
| 6,205,421 | B1 | * | 3/2001  | Morii .................... 704/226 |
| 6,725,190 | B1 | * | 4/2004  | Chazan et al. .......... 704/205 |
| 7,337,107 | B2 | * | 2/2008  | Rose et al. ............. 704/208 |
| 8,639,502 | B1 | * | 1/2014  | Boucheron et al. ...... 704/226 |
| 2003/0204394 | A1 | * | 10/2003 | Garudadri et al. ....... 704/201 |
| 2005/0114124 | A1 | * | 5/2005  | Liu et al. ............... 704/228 |
| 2005/0182624 | A1 | * | 8/2005  | Wu et al. ............... 704/233 |
| 2006/0293016 | A1 | * | 12/2006 | Giesbrecht et al. ....... 455/308 |
| 2008/0215322 | A1 | * | 9/2008  | Fischer et al. .......... 704/243 |
| 2009/0210224 | A1 | * | 8/2009  | Fukuda et al. .......... 704/233 |
| 2010/0198598 | A1 | * | 8/2010  | Herbig et al. ........... 704/240 |
| 2010/0250242 | A1 | * | 9/2010  | Li ....................... 704/200.1 |

OTHER PUBLICATIONS

Paliwal, "Decorrelated and liftered filter-bank energies for robust speech recognition," 1999, in Eurospeech, 1999, vol. 1, pp. 85-88.*
Zhu et al, "Non-linear feature extraction for robust recognition in stationary and non-stationary noise", 2003, In Computer, Speech, and Language, 17(4): 381-402.*

* cited by examiner

*Primary Examiner* — Olujimi Adesanya

(57) ABSTRACT

A method of processing a speech signal comprises converting the speech signal to digital signals, converting the digital speech signal into short-time frames, applying a Fast Fourier Transform to each of the short-time frames to obtain an original spectrum, deriving a varied spectrum based on the original spectrum, applying discrete cosine transform to compute original cepstrum coefficients for the original spectrum and varied cepstrum coefficients for the varied spectrum and generating a set of frontend feature vectors for each of the short-time frames.

15 Claims, 4 Drawing Sheets

METHOD AND APPARATUS FOR ROBUST SPEAKER AND SPEECH RECOGNITION

CROSS-REFERENCE TO RELATED APPLICATION

This application claims the benefit of U.S. provisional Application No. 61/614,446, filed on Mar. 22, 2012, the contents of which are incorporated herein by reference in their entireties.

TECHNICAL FIELD

Example embodiments of the present disclosure relate generally to speaker and speech recognition technology, and more specifically to a method and an apparatus for robust speaker and speech recognition.

BACKGROUND

Contemporary speaker recognition and speech recognition systems typically employ Mel-frequency cepstrum coefficients as the feature representation of human speech. Mel-frequency cepstrum coefficients are usually derived by digitizing human speech and applying a shifting window to obtain short-term frames to satisfy the stationary signal assumption. For each of such frames, compute the FFT (Fast Fourier Transform) spectrum, calculate filter band energy output where the center frequencies of the bands are Mel-frequency distributed, and finally use Discrete Cosine Transform (DCT) to produce Mel-frequency cepstrum coefficients (MFCC). There is one vector of MFCC's for each frame.

MFCC's can be augmented by their first-order and second-order derivatives (expanded feature vectors) to enhance the recognition performance for speaker and speech recognition. Moreover, each MFCC can also be mean-removed in order to mitigate, e.g., channel distortion.

The above MFCC's and their expansion and/or normalization work best in a quiet environment where training and testing conditions match. For noisy environments, improvements have been achieved by incorporating some noise-robust algorithms, such as spectral subtraction.

Yet, no system works optimally both for quiet and noisy environments. For example, a noise-robust system generally yields degraded recognition accuracies when operating in a quiet condition when compared to a non-noise robust counterpart.

Thus, while advancements have been made in computer-assisted speaker/speech recognition during the past several decades, contemporary speaker/speech recognition systems are nevertheless subject to a variety of problems such as the capability of mitigating noise interference and of separating inter-speaker variability from channel distortion.

SUMMARY OF THE INVENTION

According to one exemplary embodiment of the present invention, a method of processing a speech signal comprises, digitizing the speech signal, converting the digital speech signal into short-time frames, applying a Fast Fourier Transform to each of the short-time frames to obtain an original spectrum, deriving a varied spectrum based on the original spectrum, applying discrete cosine transform to compute cepstrum coefficients for the original spectrum and cepstrum coefficients for the varied spectrum and generating a set of frontend feature vectors for each of the short-time frames.

According to one exemplary embodiment of the present invention, an apparatus of processing a speech signal comprises an analog-to-digital converter (A/D) configured to digitize the speech signal, a windowing unit configured to convert the digital speech signal into short-time frames, a spectrum analyzer unit configured to apply a Fast Fourier Transform to each of the short-time frames to obtain an original spectrum, a spectrum deriving unit configured to derive a varied spectrum based on the original spectrum and a discrete cosine transform unit configured to apply discrete cosine transform to compute cepstrum coefficients for the original spectrum and cepstrum coefficients for the varied spectrum.

According to one exemplary embodiment of the present invention, a computer program product comprises a non-transitory computer readable storage medium and computer program instructions stored therein. The computer program instructions comprise program instructions configured to digitize the speech signal by an analog-to-digital converter, convert the digital speech signal into short-time frames by a windowing unit, apply a Fast Fourier Transform to each of the short-time frames to obtain an original spectrum by a spectrum analyzer unit, derive a varied spectrum based on the original spectrum by a spectrum deriving unit and apply discrete cosine transform to compute cepstrum coefficients for the original spectrum and cepstrum coefficients for the varied spectrum, respectively, by a discrete cosine transform unit.

DETAILED DESCRIPTION OF THE EMBODIMENTS

Figure 1:
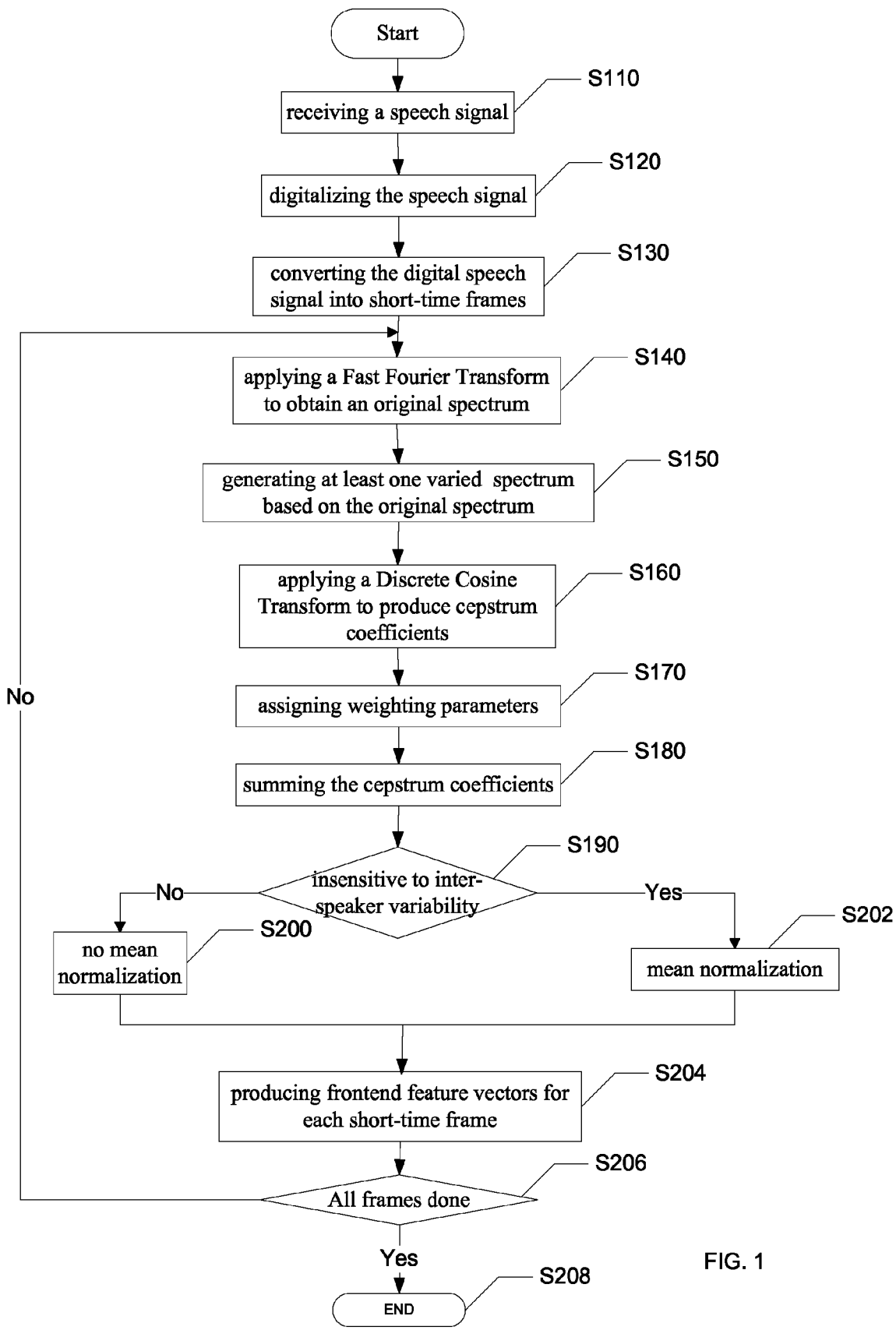
FIG. 1 illustrates a flow chart of calculating frontend feature vectors for speaker and speech recognition in accordance with an exemplary embodiment of the present invention.
Figure 2:
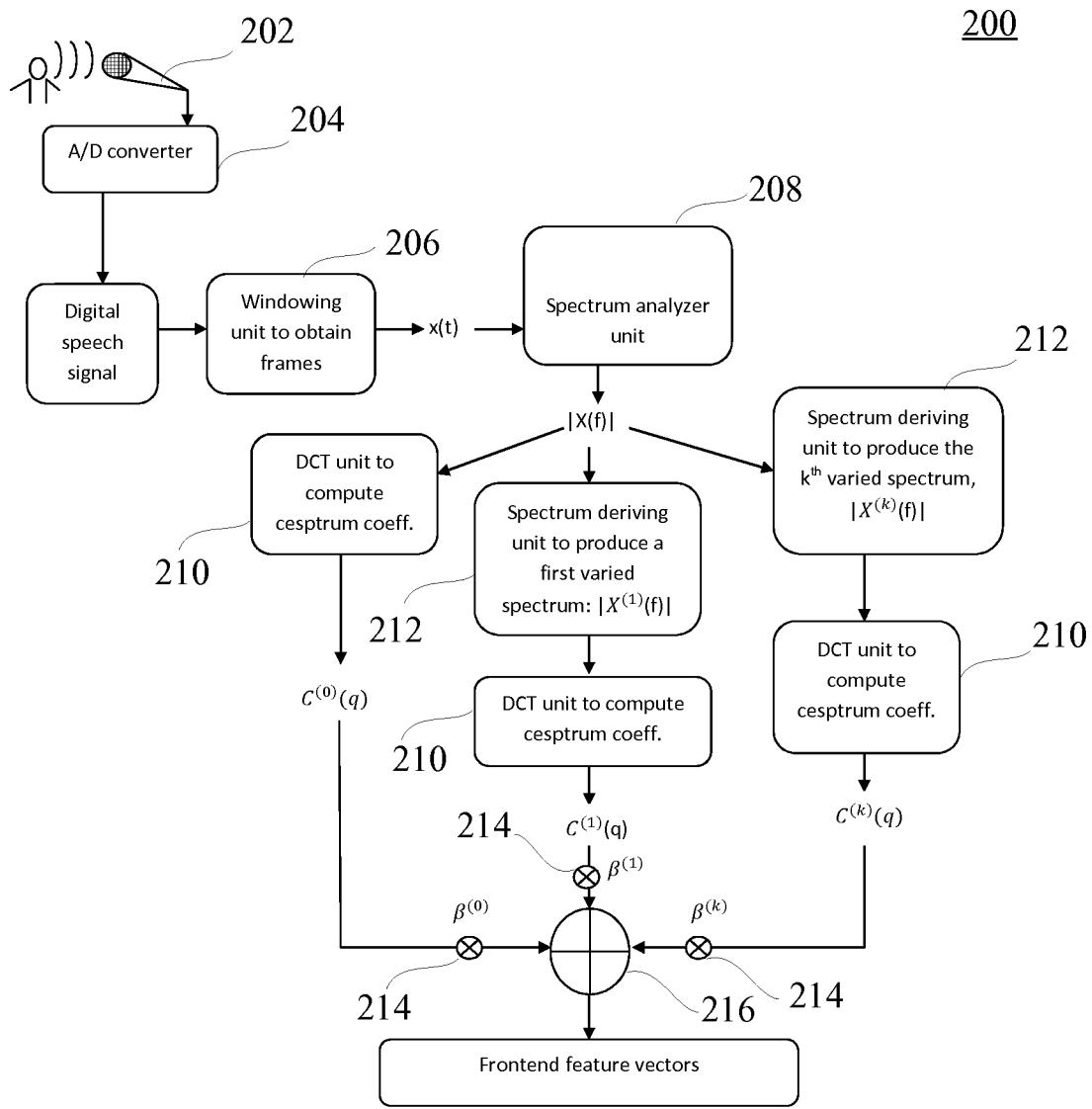
FIG. 2 is a diagram of a signal processing system in accordance with an exemplary embodiment of the present invention.

FIG. 1 illustrates a flow chart of calculating frontend feature vectors for speaker and speech recognition in accordance with an exemplary embodiment of the present invention ("example," "exemplary" and like terms as used herein refer to "serving as an example, instance or illustration"). FIG. 2 is a diagram of a signal processing system 200 in accordance with an exemplary embodiment of the present invention. With reference to FIGS. 1 and 2, speaker/speech recognition may comprise receiving speech signals from a speaker by a sound pickup device, for example, a microphone 202 (shown in FIG. 2) at step S110 or a file input. The speech signal is then processed at subsequent steps. For example, at step S120, the speech signal may be converted to digital signal by an analog-to-digital converter 204 (shown in FIG. 2) to obtain digital speech signal.

A window function (such as Hamming window) may be applied by a windowing unit 206 (shown in FIG. 2) to the digital speech signals to obtain partially-overlapped frames (at S130) and conduct short-time spectral analysis at step S140. During the short-time spectral analysis, the digital speech signal may be divided into frames of, for example, about 10-30 ms over which the speech waveform is considered to be stationary. Each frame may be a short-time speech signal. In one embodiment, the microphone may pick up a one-second long audio signal. A window with size of 25 ms may be applied to obtain frames out of the one-second long audio signal. If we advance the window by an amount of 10 ms each time (i.e., with an overlap amount of 15 ms), 100 frames, or in other words, 100 short-time speech signals may be obtained. In this example, a frame may have 200 samples at a sampling rate of 8 kHz or alternatively, 400 samples using the window of the same length at a sampling rate of 16 kHz.

Figure 3:
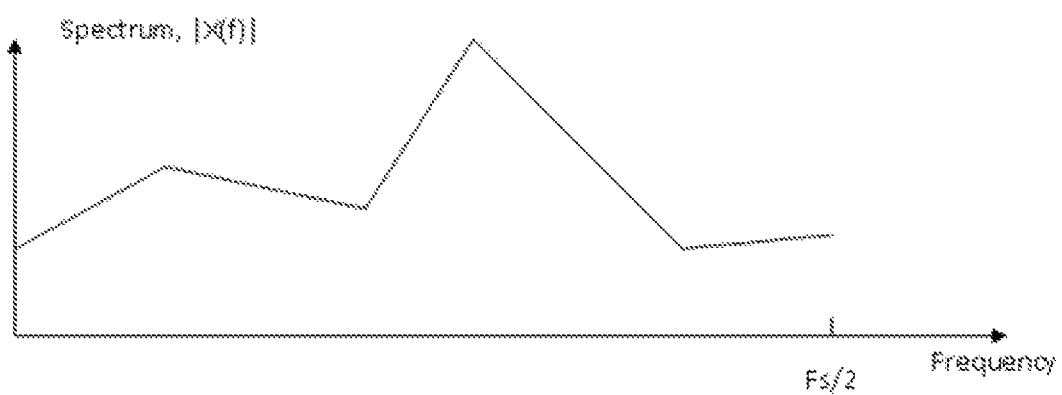
FIG. 3 illustrates a stylized FFT amplitude spectrum of a short-time signal.

Each frame (namely, each short-time speech signal) may then be transformed to the frequency domain through, for example, Fast Fourier Transform by a spectrum analyzer unit 208 (shown in FIG. 2) to obtain a short time amplitude spectrum at step S140 using linearly-spaced frequency bands. Assume that a short-time speech signal is x(t), where t is the time index. Further assume that the short time amplitude spectrum obtained by applying Fast Fourier Transform is |X(f)|, where f is the frequency index. FIG. 3 illustrates the stylized Fast Fourier Transform amplitude spectrum |X(f)| of the short-time signal x(t), where $F_s$ is the sampling frequency in Hz. Useful spectral information may be contained in the frequency range from 0 to $F_s/2$. The short time amplitude spectrum (i.e., |X(f)|) obtained above at step S140 by the spectrum analyzer unit 208 may be determined as an original spectrum $|X^{(0)}(f)|$.

In addition to using the original spectrum $|X^{(0)}(f)|$, one embodiment proposes to derive one or more varied spectra from the original spectrum $|X^{(0)}(f)|$, by taking into account of spectral subtraction, use of less noise-vulnerable spectral region, use of spectral region that carries more idiosyncratic discriminability, etc. In this embodiment, one or more varied spectra may be derived by a spectrum deriving unit 212 at step S150 based on the original spectrum $|X^{(0)}(f)|$. With reference to FIG. 2, one varied spectrum $|X^{(1)}(f)|$ and more than one varied spectrum $|X^{(2)}(f)| \ldots |X^{(k)}(f)|$ be derived by the spectrum deriving unit 212 based on the original spectrum $|X^{(0)}(f)|$. In one embodiment, the variant may be that after applying spectrum subtraction to combat additive noise or that after removing or attenuating spectrum regions that are susceptible to acoustic environment changes but contain only little speaker information.

For the original spectrum and its derived varied spectra $|X^{(0)}(f)|, |X^{(1)}(f)|, \ldots, |X^{(k)}(f)|$, where k=0, 1, 2, ..., K, a discrete cosine transform may be applied by a discrete cosine transform unit (e.g., a discrete cosine transform unit 210) at step S160 to each of the original spectrum $|X^{(0)}(f)|$ and to the one or more varied spectra $|X^{(1)}(f)| \ldots |X^{(k)}(f)|$ to produce corresponding original cepstrum coefficients and varied cepstrum coefficients) $C^{(0)}(q), C^{(1)}(q) \ldots C^{(k)}(q)$, where k=0, 1, 2, ..., K. Note that q is the index of cepstrum coefficients.

In some examples, to obtain cepstrum coefficients which approximate the human auditory systems' response more closely than the linearly-spaced frequency bands used in the original spectrum $|X^{(0)}(f)|$ and/or its variants $|X^{(1)}(f)| \ldots |X^{(k)}(f)|$, powers of the original spectrum $|X^{(0)}(f)|$ and/or the varied spectra $|X^{(1)}(f)| \ldots |X^{(k)}(f)|$ may be mapped onto the Mel scale of frequency, followed by computing logarithms of the powers at each of the Mel frequency bands, resulting in nonlinear spaced frequency bands on the Mel scale. Then the discrete cosine transform may be applied to the log powers to produce Mel frequency cepstrum coefficients. Mel frequency spectrum is well known in the art and will not be explained in detail in this application.

After one or more sets of cepstrum coefficients (e.g., $C^{(0)}(q), C^{(1)}(q) \ldots C^{(k)}(q)$) are computed, weighting parameters $\beta^{(0)}, \beta^{(1)}, \ldots, \beta^{(k)}$ that decide what set or sets of cepstrum coefficients receives more relatively heavier weights may be assigned to each cepstrum coefficient. For example, a weighting assignment unit 214 in FIG. 2 may weight each cepstrum coefficient at step S170 in FIG. 1. Weighting parameters may abide by equation: $\Sigma_{k=0}^{K}\beta^{(k)}=1$. In one example, when one varied cepstrum is derived, $\beta^{(0)}, \beta^{(1)}$ may be assigned to the original cepstrum coefficients $C^{(0)}(q)$ and the varied cepstrum coefficients $C^{(1)}(q)$, respectively. In this case, weighting parameters may abide by equation: $\beta^{(0)}+\beta^{(1)}=1$. These weighted cepstrum coefficients may then be summed by an adder 216 (shown in FIG. 2) at the corresponding quefrency indexes (the reciprocal of frequency, having the unit of time) at step S180 to produce a set of superposed frontend feature vectors. Also with reference to FIG. 2, each of the original cepstrum coefficients $C^{(0)}(q)$ and varied cepstrum coefficients $C^{(1)}(q) \ldots C^{(k)}(q)$ may be weighted and assigned with weighting parameters $\beta^{(0)}, \beta^{(1)} \ldots \beta^{(K)}$ respectively. The weighted cepstrum coefficients are then superposed together by the adder 216 to produce a set of superposed frontend feature vectors. The superposed frontend feature vectors of the short-time speech signal x(t) may be represented by $$\tilde{C}(q) = \sum_{k=0}^{K} \beta^{(k)} C^{(k)}(q).$$

The superposed frontend feature vectors may then be mean-normalized by a mean normalization unit (not shown in FIG. 2) to obtain a set of mean-normalized frontend feature vectors which will be discussed in detail at step S202. The superposed frontend feature vectors and/or the mean-normalized frontend feature vectors may be augmented by their first-order derivatives. In another embodiment, second-order derivatives may be derived from the first-order derivatives by a frontend feature vector derivation unit (not shown in FIG. 2).

Cepstrum coefficients are common frontend feature vectors for speaker recognition and for speech recognition. To get better performance in noise environments, the cepstrum coefficients (e.g., original cepstrum coefficients and/or varied cepstrum coefficients) produced above may be further normalized in cepstrum domain using, for example, cepstrum mean normalization technique, to produce robust feature vectors. For speech recognition, cepstrum coefficient mean normalization of certain length (can be as long as the entire utterance) is effective in mitigating channel distortion, a distortion characteristic of convolution in the time domain (which pertains to addition in the cepstrum domain). For speaker recognition, however, cepstrum coefficient mean normalization is not as effective and efficient. The lack of success for speaker recognition is due to the fact that although cepstrum coefficient mean normalization may successfully eliminate or minimize channel distortion, it at the same time also reduces inter-speaker difference. An example is speaker's vocal tract length, which has played an important role in speaker recognition. During speech production, the vocal tract and other articulators convolute with the excitation source (the glottal source or a friction source). As a result, speaker recognition does not gain too much in accuracy or robustness by mean normalizing cepstrum coefficients.

As such, it is desirable to determine which cepstrum coefficients are insensitive to inter-speaker variability and separate cepstrum coefficients that are insensitive from those that are not. Insensitivity determination may be performed after weighting the original cepstrum coefficient and varied cepstrum coefficients at step S170 and superposing the weighted cepstrum coefficients at step S180, as shown in FIG. 1. In another embodiment, the insensitivity determination may be performed prior to steps S170 and S180 depending on various applications.

Referring back to FIG. 1, if some of the original and varied cepstrum coefficients are determined to be sensitive to inter-speaker variability at step S190, no mean normalization is performed on these superposed cepstrum coefficients at step S200 for the task of speaker recognition. In this manner, superposed frontend feature vectors may be produced at step S204.

On the other hand, if some of the original and varied cepstrum coefficients are determined to be insensitive to inter-speaker variability at step S190, the superposed cepstrum coefficients may be mean normalized at step S202, by a mean normalization unit (not shown in FIG. 2), to improve the robustness of the frontend feature vectors to channel distortions. In one embodiment, assume that there are Q+1 cepstrum coefficients, $\tilde{c}(q)$, q=0, 1, 2, . . . , Q. The mean normalization may be embodied as a subtraction of the mean over a certain length, usually the entire utterance. In this case, the procedure is as follows:

$$m_q = \frac{1}{N}\sum_{n=1}^{N}\tilde{C}_{n,q}, \quad (1)$$

$$q = 0, 1, 2, \ldots, Q$$

where $\tilde{C}_{n,q}$ represents the $q^{th}$ cepstrum coefficient at frame n, $m_q$ is the mean of the $q^{th}$ cepstrum coefficient, and N is the number of frames over which the mean is calculated.

Mean normalization may be implemented according to the following equations.

$$\hat{C}_{n,q} = \tilde{C}_{n,q} - m_q, \; n=1,2,\ldots,N \text{ and } q \in q^c \quad (2a)$$

$$\hat{C}_{n,q} = \tilde{C}_{n,q}, \; n=1,2,\ldots,N \text{ and } q \in q^s \quad (2b)$$

$$N_{q^c} + N_{q^s} = Q+1 \quad (2c)$$

Note that $q^s$ stands for the collection of cepstrum coefficients whose mean may be preserved to maintain maximum inter-speaker difference, and that $q^c$ stands for the collection of cepstrum coefficients that may be mean-normalized to elevate the system's robustness against channel variation, thus producing mean-normalized frontend feature vectors for each short-time frame at step S204. In equations (2a) and (2b), $\hat{C}_{n,q}$ is the $q^{th}$ cepstrum coefficient at frame index n. From the above equations, it is seen that $\hat{C}_{n,q}$ equals to $\tilde{C}_{n,q}$ for cepstrum indexes belonging to $q^s$. In this case, cepstrum coefficients are selectively mean-normalized for speaker recognition.

In addition to the above subtraction approach, one may also utilize a high pass filter to rid of the mean component. Use of high-pass filter has the advantage of small latency because the process can commence as soon as the speaker starts speaking. The filter is typically implemented as a first-order difference equation in the discrete time domain:

$$\hat{C}_{n,q} = \tilde{C}_{n,q} - a \cdot \tilde{C}_{n-1,q}, \text{ for } q \in q^c, \text{ and } n=1,2,\ldots,N. \quad (3a)$$

$$\hat{C}_{n,q} = \tilde{C}_{n,q}, \text{ for } q \in q^s, \text{ and } n=1,2,\ldots,N. \quad (3b)$$

$$\tilde{C}_{0,q} = 0 \quad (3c)$$

where a is a decimal number between 0 and 1 (exclusive). Often a may be set to 0.95. And equation (3c) is frequently referred to as the initialization condition.

At step 206, if each short-time frame has obtained its associated superposed frontend feature vectors and/or mean-normalized frontend feature vectors, method may end at step 208. Otherwise, method may proceed to step S140 to perform the conversions, derivations and generations as described above.

Figure 4:
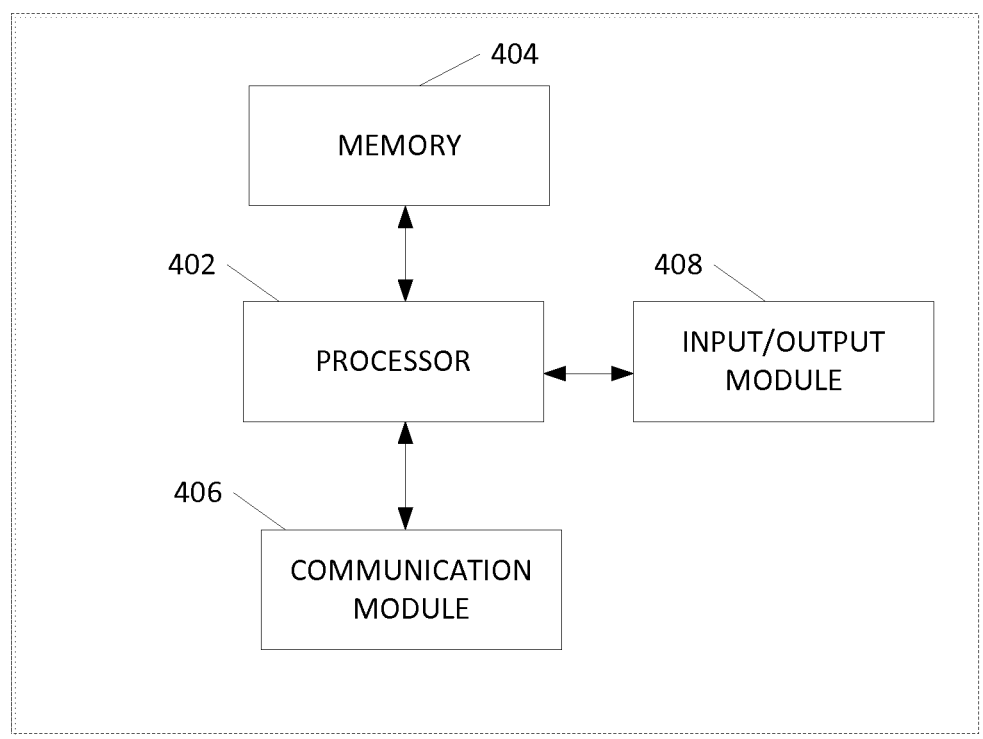
FIG. 4 illustrates a diagram of computing the new frontend feature vectors.

FIG. 4 shows a schematic block diagram of circuitry 400, some or all of which may be included in, for example, A/D converter 204, windowing unit 206, spectrum analyzer unit 208, discrete cosine transform unit 210, spectrum deriving unit 212, and/or frontend feature vector generation unit (not shown). In accordance with some example embodiments, circuitry 400 may include various means, such as one or more processors 402, memories 404, communications modules 406, and/or input/output modules 408.

As referred to herein, "module" includes hardware, software and/or firmware configured to perform one or more particular functions described herein. In this regard, the means of circuitry 400 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 404) that is executable by a suitably configured processing device (e.g., processor 402), or some combination thereof.

Processor 402 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments, processor 402 may comprise a plurality of processors. The plurality of processors may be embodied on a single computing device or may be distributed across a plurality of computing devices collectively configured to function as circuitry 400. The plurality of processors may be in operative communication with each other and may be collectively configured to perform one or more functionalities of circuitry 400 as described herein. In an example embodiment, processor 402 is configured to execute instructions stored in memory 404 or otherwise accessible to processor 402. These instructions, when executed by processor 402, may cause circuitry 400 to perform one or more of the functionalities of circuitry 400 as described herein.

Whether configured by hardware, firmware/software methods, or by a combination thereof, processor 402 may comprise an entity capable of performing operations according to embodiments of the present invention while configured accordingly. Thus, for example, when processor 402 is embodied as an ASIC, FPGA or the like, processor 402 may comprise specifically configured hardware for conducting one or more operations described herein. As another example, when processor 402 is embodied as an executor of instructions, such as may be stored in memory 404, the instructions may specifically configure processor 402 to perform one or more algorithms and operations described herein.

Memory 404 may comprise, for example, volatile memory, non-volatile memory, or some combination thereof. Although illustrated in FIG. 4 as a single memory, memory 404 may comprise a plurality of memory components. The plurality of memory components may be embodied on a single computing device or distributed across a plurality of computing devices. In various embodiments, memory 404 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 404 may be configured to store information, data, applications, instructions, or the like for enabling circuitry to carry out various functions in accordance with example embodiments discussed herein. For example, in at least some embodiments, memory 404 is configured to buffer input data for processing by processor 402. Additionally or alternatively, in at least some embodiments, memory 404 may be configured to store program instructions for execution by processor 402. Memory 404 may store information in the form of static and/or dynamic information. This stored information may be stored and/or used by circuitry 400 during the course of performing its functionalities.

Communications module 406 may be embodied as any device or means embodied in circuitry, hardware, a computer program product comprising computer readable program instructions stored on a computer readable medium (e.g., memory 404) and executed by a processing device (e.g., processor 402), or a combination thereof that is configured to receive and/or transmit data from/to another device, for example, another circuitry and/or the like. In some embodiments, communications module 406 (like other components discussed herein) can be at least partially embodied as or otherwise controlled by processor 402. In this regard, communications module 406 may be in communication with processor 402, such as via a bus. Communications module 406 may include, for example, an antenna, a transmitter, a receiver, a transceiver, network interface card and/or supporting hardware and/or firmware/software for enabling communications with another computing device. Communications module 406 may be configured to receive and/or transmit any data that may be stored by memory 404 using any protocol that may be used for communications between computing devices. Communications module 406 may additionally or alternatively be in communication with the memory 404, input/output module 408 and/or any other component of circuitry 400, such as via a bus.

Input/output module 408 may be in communication with processor 402 to receive audio signals and/or to produce an audible, visual and/or other output to a user. For example, for speaker recognition, an identity of a specific speaker may be provided to a user, or performing a certain action such as voiceprint for access control. For speech recognition, the output may comprise displaying transcript text on a screen or execution of a voice command. As such, input/output module 408 may include a microphone, a loudspeaker or earpiece, a display and/or other input/output mechanisms.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. Each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 402 discussed above with reference to FIG. 4, to produce a machine, such that the computer program product includes the instructions which execute on the computer or other programmable data processing apparatus to create a means for implementing the functions specified in the flowchart block or blocks.

These computer program instructions may also be stored in a computer-readable storage medium (e.g., memory 404) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, the block diagrams and flowchart illustrations support combinations of means for performing the specified functions, combinations of steps for performing the specified functions and program instruction means for performing the specified functions. It will also be understood that each block/step of the circuit diagrams and process flowcharts, and combinations of blocks/steps in the circuit diagrams and process flowcharts, can be implemented by special purpose hardware-based computer systems that perform the specified functions or steps, or combinations of special purpose hardware and computer instructions.

What is claimed is:

1. A method of processing a speech signal, comprising the steps of:
   a. converting, by an analog-to-digital converter, the speech signal to digital signals;
   b. converting, by a windowing unit, the digital speech signal into short-time frames;
   c. applying, by a spectrum analyzer unit, a Fast Fourier Transform to each of the short-time frames to obtain an original spectrum;
   d. deriving, by a spectrum deriving unit, a varied spectrum based on the original spectrum;
   e. applying, by a discrete cosine transform unit, discrete cosine transform to compute original cepstrum coefficients for the original spectrum and varied cepstrum coefficients for the varied spectrum; and
   f. superposing the original cepstrum coefficients and varied cepstrum coefficients to produce a set of frontend feature vectors for each of the short-time frames.

2. The method of claim 1, further comprising the step of receiving, by a sound pickup device or from a file input, the speech signal from a speaker.

3. A method of processing a speech signal, comprising the steps of:
   a. converting, by an analog-to-digital converter, the speech signal to digital signals;
   b. converting, by a windowing unit, the digital speech signal into short-time frames;
   c. applying, by a spectrum analyzer unit, a Fast Fourier Transform to each of the short-time frames to obtain an original spectrum;
   d. deriving, by a spectrum deriving unit, a varied spectrum based on the original spectrum;
   e. applying, by a discrete cosine transform unit, discrete cosine transform to compute original cepstrum coefficients for the original spectrum and varied cepstrum coefficients for the varied spectrum;
   f. generating a set of frontend feature vectors for each of the short-time frames;
   g. assigning weighting parameters to each of the original cepstrum coefficients and varied cepstrum coefficients; and
   h. superposing, by an adder, the weighted original cepstrum coefficients and varied cepstrum coefficients to produce a set of superposed frontend feature vectors.

4. The method of claim 3, further comprising the step of mean-normalizing, by a mean normalization unit, one of the superposed frontend feature vectors in an instance in which one of the superposed cepstrum coefficients is insensitive to inter-speaker variability.

5. The method of claim 3, further comprising the step of selectively mean-normalizing, by a mean normalization unit, coefficients of the superposed frontend feature vectors in speaker recognition.

6. The method of claim 3, further comprising the step of mean-normalizing, by a mean normalization unit, coefficients of the superposed frontend feature vectors in speech recognition.

7. The method of claim 3, further comprising the step of generating, by a frontend feature vector generation unit, a set of first-order derivatives and second-order derivatives of the superposed cepstrum coefficients.

8. An apparatus of processing a speech signal, comprising:
   a. an analog-to-digital converter configured to convert the speech signal to digital signals;
   b. a windowing unit configured to convert the digital speech signal into short-time frames;
   c. a spectrum analyzer unit configured to apply a Fast Fourier Transform to each of the short-time frames to obtain an original spectrum;
   d. a spectrum deriving unit configured to derive a varied spectrum based on the original spectrum;
   e. a discrete cosine transform unit configured to apply discrete cosine transform to compute original cepstrum coefficients for the original spectrum and varied cepstrum coefficients for the varied spectrum; and
   f. an adder configured to sum the original cepstrum coefficients and the varied cepstrum coefficients to generate a set of superposed frontend feature vectors.

9. The apparatus of claim 8, further comprising a frontend vector generation unit configured to produce a set of first-order derivatives and second-order derivatives of the superposed cepstrum coefficients.

10. The apparatus of claim 8, further comprising a mean normalization unit configured to mean-normalize coefficients of the superposed frontend feature vectors in an instance in which one of the superposed cepstrum coefficients is insensitive to inter-speaker variability.

11. The apparatus of claim 8, further comprising a mean normalization unit configured to selectively mean-normalize coefficients of the superposed frontend feature vectors in speaker recognition.

12. The apparatus of claim 8, further comprising a mean normalization unit configured to mean-normalize the superposed frontend feature vectors in speech recognition.

13. The apparatus of claim 8, wherein the discrete cosine transform unit is configured to produce a set of frontend feature vectors by superposing the original cepstrum coefficients and varied cepstrum coefficients.

14. The apparatus of claim 8, further comprising a sound pickup device configured to receive the speech signal from a speaker.

15. The apparatus of claim 8, further comprising a weighting assignment unit configured to assign weighting parameters to the original cepstrum coefficients and the varied cepstrum coefficients.

* * * * *